(12) United States Patent
Kojima

(10) Patent No.: US 6,633,401 B1
(45) Date of Patent: Oct. 14, 2003

(54) IMAGE FORMING DEVICE THAT SAVES RECORDING MEDIUM WHEN PRINTING COMMUNICATION DATA

(75) Inventor: Yasumichi Kojima, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/292,308

(22) Filed: Apr. 15, 1999

(30) Foreign Application Priority Data

Apr. 16, 1998 (JP) .......................................... 10-106256

(51) Int. Cl.[7] .............................. G06F 15/00; H04N 1/00
(52) U.S. Cl. ...................... 358/1.15; 358/1.1; 358/1.15; 358/1.16; 358/402; 358/442; 358/407
(58) Field of Search ............................. 358/1.15, 1.16, 358/1.18, 1.11, 402, 442, 407

(56) References Cited

U.S. PATENT DOCUMENTS

| 5,383,029 A | * | 1/1995 | Kojima | ........................ 358/403 |
|---|---|---|---|---|
| 5,613,017 A | * | 3/1997 | Rao et al. | ..................... 382/174 |
| 5,647,056 A | * | 7/1997 | Barrett et al. | ............. 395/200.1 |
| 5,812,278 A | * | 9/1998 | Toyoda et al. | ............... 358/402 |
| 5,905,783 A | * | 5/1999 | Tonegawa | ............... 379/100.07 |
| 6,101,292 A | * | 8/2000 | Udagawa | ..................... 382/299 |
| 6,195,513 B1 | * | 2/2001 | Nihei et al. | .................. 396/332 |
| 6,310,693 B1 | * | 10/2001 | Hiraike | ....................... 358/1.15 |
| 6,356,359 B1 | * | 3/2002 | Motamed | ..................... 358/1.8 |
| 6,377,978 B1 | * | 4/2002 | Nguyen | ...................... 709/206 |

FOREIGN PATENT DOCUMENTS

JP 1132262 5/1989

* cited by examiner

Primary Examiner—Edward Coles
Assistant Examiner—Saeid Ebrahimi
(74) Attorney, Agent, or Firm—Oliff & Berridge

(57) ABSTRACT

When a specified type of communication data is received by a specified interface, the communication data is processed into intermediate data based on a sheet-saving print format. Upon receiving print command, an image forming device executes sheet-saving printing for forming a compressed image based on the intermediate data. Because a relatively large amount of communication data can be printed out on a single page in this way, wasting of recording medium can be prevented.

31 Claims, 10 Drawing Sheets

FIG. 10

IMAGE FORMING DEVICE THAT SAVES RECORDING MEDIUM WHEN PRINTING COMMUNICATION DATA

BACKGROUND OF THE INVENTION

1. Field of the Invention

The present invention relates to an image forming device for forming an image on a recording medium based on communication data transmitted from communication devices and information processing devices.

2. Description of the Related Art

There has been known an image forming device for forming an image on a recording medium based on data transmitted from external devices. More specifically, when communication data is received from an external device, the communication data is processed into image data and stored in a memory. Then, an image is formed on a recording sheet based on the image data upon request by a user. In this way, the image corresponding to the communication data can be formed.

For example, a conventional Internet facsimile device receives communication data, such as, facsimile data over a telephone circuit and also e-mail data over the Internet, and forms images on a cut sheet based on the communication data.

E-mail messages are not transmitted in page units, contrary to facsimile messages. Also, e-mail messages are extremely easy to send, so users tend to send them more frequently.

When the facsimile device forms an image on a cut sheet based on such small-sized e-mail data, the image will occupy only a small part of the cut sheet, and the remaining large part of the cut sheet will be left blank. This wastes recording medium. Also, because each e-mail message is printed on a separate cut sheet, when such small sized e-mail data is received frequently, large amounts of recording medium are wasted. The same problem will occur when small-sized facsimile messages are received.

SUMMARY OF THE INVENTION

It is an objective of the present invention to solve the above-described problems and also to provide an image forming device capable of preventing wasting recording medium when forming an image based on data transmitted from a remote device, and a method of and a recording medium storing a program of controlling the image forming device.

In order to achieve the above and other objectives there is provided an image forming device comprising a interface that receives communication data from remote devices, a first memory that stores the communication data, a second memory that stores a format, a process unit that processes specified type of communication data into compressed intermediate data based on the format, a printer that executes printing for forming a compressed image on a recording medium based on the compressed intermediate data, and a control unit that controls the printer to execute printing.

Also, there is provided an image forming device including a plurality of interfaces that receive communication data from remote devices, a first memory that stores the communication data, a second memory that stores a format, a process unit that processes the communication data which is received by a specified one of the plurality of interfaces into compressed intermediate data based on the format, a printer that executes printing for forming a compressed image on a recording medium based on the compressed intermediate data, and a control unit that controls the printer to execute printing.

Further, there is provided an image forming device including a plurality of interfaces that receive communication data from remote devices, a detection unit that detects data type of the communication data, a mode selecting unit that selects a sheet-saving mode when specified type of communication data is received and selects a normal mode when unspecified type of communication data is received, a memory that stores a sheet-saving format and a normal format, a process unit that processes the communication data into intermediate data based on the sheet-saving format when the sheet-saving mode is selected and on the normal format when the normal mode is selected, and a printer that executes printing based on the intermediate data. The sheet-saving format indicates at least one of pitch reduction rate, font size reduction rate, and whether or not to ignore a form feed code.

Still further, there is provided A method of controlling an image forming device for forming an image based on communication data received by an interface, the method comprising the steps of a) receiving communication data, b) determining whether or not the communication data is of a specified type, c) processing the communication data into compressed intermediate data based on a format when the communication data is detected to be of the specified type, d) storing the compressed intermediate data into a memory; and e) forming a compressed image based on the compressed intermediate data.

There is also provided a recording medium storing a program of controlling an image forming device. The program includes the programs of a) receiving communication data, b) determining whether or not the communication data is of a specified type, c) processing the communication data into compressed intermediate data based on a format when the communication data is detected to be of the specified type, d) storing the compressed intermediate data into a memory, e) forming a compressed image based on the compressed and intermediate data.

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENT

An image forming device 1 according to a preferred embodiment of the present invention will be described while referring to the accompanying drawings. The image forming device 1 has a function for forming an image on a cut sheet based on data transmitted from a variety of external or remote devices.

Figure 1:
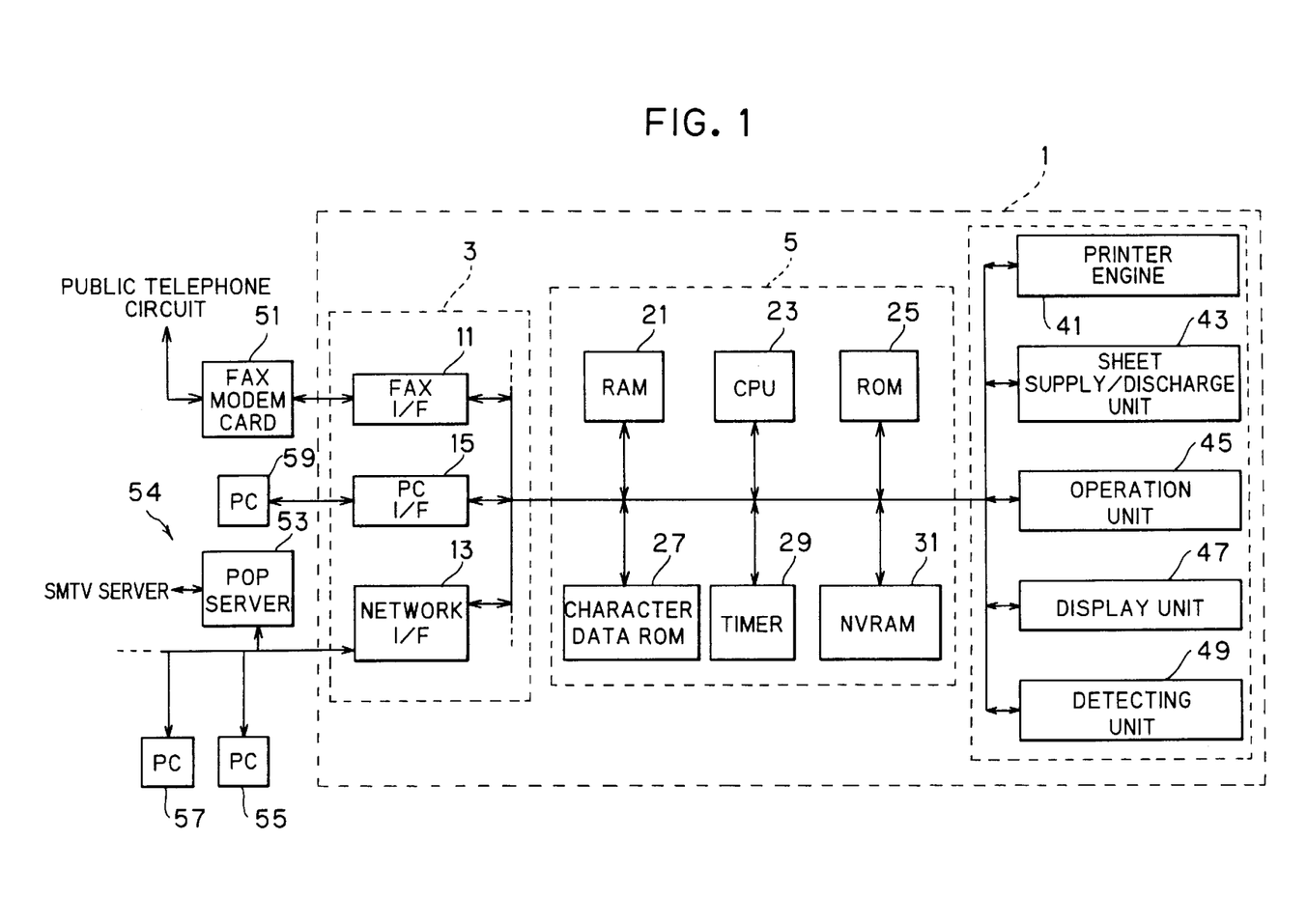
FIG. 1 is a block diagram showing a configuration of an image forming device according to an embodiment of the present invention.

First, configuration of the image forming device 1 will be described while referring to FIG. 1. As shown in FIG. 1, the image forming device 1 includes a connection unit 3, a control unit 5, and a mechanical portion 7. The image forming device 1 is connected, via the connection unit 3, to a facsimile (FAX) modem card 51, a personal computer (PC) 59, and a local area network (LAN) 54.

The connection unit 3 includes a facsimile (FAX) interface 11, a network interface 13, and a personal computer (PC) interface 15. The FAX interface 11 is provided with, for example, a PCMCIA slot complying with the Personal Computer Memory Card International Association (PCMCIA) standards.

The network interface 13 is provided with, for example, a 10-Base-T terminal or a 100-Base-T terminal. The LAN 54 includes a Post Office Protocol (POP) server 53 and personal computers 55, 57. The POP server 53 is connected to a Simple Mail Transfer Protocol (SMTP) server to receive e-mail data addressed to the POP server 53. The personal computers 55, 57 are well-known personal computers and output print data to the image forming device 1. The personal computers 55, 57 also transmit and receive e-mail data to and from remote devices.

The PC interface 15 includes a serial interface, such as a RS232C serial interface. However, the PC interface 15 can include a parallel interface rather than the serial interface.

The control unit 5 includes a random access memory (RAM) 21, a central processing unit (CPU) 23, a read only memory (ROM) 25, a character data ROM 27, a timer 29, and a non-volatile random access memory (NVRAM) 31. The CPU 23 is for executing various functions by performing calculation processes. The RAM 21 stores includes plurality of storing areas to be described later. The ROM 25 stores programs to be executed by the CPU 23. The character data ROM 27 stores font data for each point of various fonts. The timer 29 is for indicating a preset time. The NVRAM 31 is for storing data inputted by a user.

The mechanical portion 7 includes a printer engine 41, a sheet supply/discharge unit 43, an operation unit 45, a display unit 47, and a detecting unit 49. Although not shown in the drawings, the printer engine 41 includes motors for driving an image forming mechanism for forming a multi-color image on a cut sheet. The multicolor image is formed by using yellow color toner, magenta color toner, cyan color toner, and black color toner supplied from toner stations. The sheet supply/discharge unit 43 includes a sheet supply mechanism for supplying a cut sheet, from a plurality of supply trays, to the printer engine 41 as required, and also a sorter for discharging the cut sheet onto a selective stacker. The operation unit 45 includes a variety of input switches for inputting commands, and a power switch. The display unit 47 includes a liquid crystal display and a light emitting diode (LED) for indicating conditions of the image forming device 1. The detecting unit 49 includes a sheet size detecting sensor, a sheet type detecting sensor, and a discharge sensor. Using these sensors, the detecting unit 49 can detect the size of cut sheets and paper jams.

With this configuration, the image forming device 1 receives facsimile data transmitted over a public telephone circuit, e-mail data from the POP server 53, and print data from the personal computers 55, 57. The facsimile data, e-mail data, and the print data are collectively referred to as communication data. The image forming device 1 forms an image on a cut sheet based on the communication data. It should be note that communication data includes image data and data indicating its data source, that is, transmission site, and destination.

Figure 2:
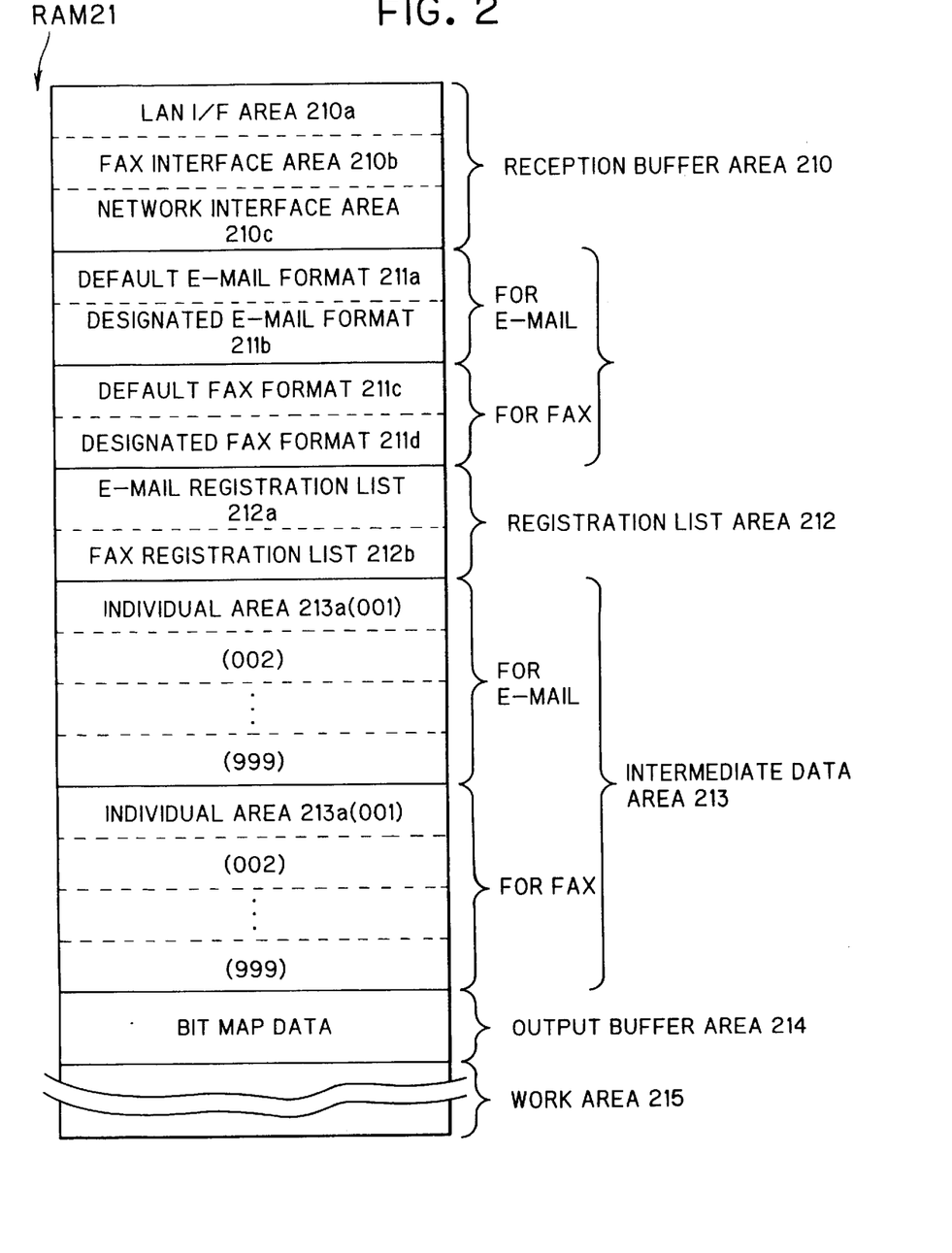
FIG. 2 is a diagram showing a RAM provided in the image forming device of FIG. 1.

Next, the RAM 21 will be described while referring to FIG. 2. As shown in FIG. 2, the RAM 21 includes a reception buffer area 210, a format area 211, a registration list area 212, an intermediate data area 213, an output buffer area 214, and a work area 215. The reception buffer area 210 includes a LAN interface buffer 210a, a facsimile interface buffer 210b, and a network interface buffer 210c.

The format area 211 stores sheet-saving print formats, that is, a default mail format 211a, a designated mail format 211b, a default facsimile format 211c, and a designated facsimile format 211d.

The registration list area 212 stores a mail registration list 212a and a facsimile registration list 212b. The mail registration list 212a lists e-mail destinations, and the facsimile registration list 212b lists facsimile data sources.

The intermediate data area 213 includes a plurality of individual areas 213a, each provided for storing intermediate data. An individual area 213a is provided for each of the e-mail destinations listed in the mail registration list 212a and for each of the facsimile data sources listed in the facsimile registration list 212b.

The output buffer 214 is for storing bit map data generated from intermediate data.

Although not shown in the drawings, various flags including a sheet-saving flag, a specified time flag, a timeup print flag, an inclusive mode flag, a page basis print flag, and a print mode switch flag are also stored in the RAM 21. Each of these flags are selectively set to ON and OFF conditions as needed. The sheet-saving flag indicates a sheet-saving print mode wherein a compressed image is formed based on communication data. The specified time flag indicates a specified time mode wherein communication data received at specified time is automatically printed out. The timeup print flag indicates a timeup print mode wherein communicated data is automatically printed out after a predetermined time duration has been elapsed. The inclusive mode flag indicates an inclusive mode and relates to whether the registration lists 212a, 212b should be referred to or not. The page basis print flag indicates a page basis print mode wherein intermediate data is printed out when one sheet's worth of intermediate data is generated. The print mode switch flag relates to whether the sheet-saving flag should be set to On or OFF.

When facsimile data or e-mail data is received, the received data is processed into intermediate data based on the corresponding sheet-saving print format, and the intermediate data is stored in a predetermined area of the RAM 21. For example, e-mail data can be processed into intermediate data wherein line pitch and font size are reduced and form feed code is ignored. Then, when requested, sheet-saving printing is performed for forming a compressed image based on the intermediate data.

It should be noted that intermediate data may be communication data which has been edited and changed into a suitable form for data processing. The intermediate data includes image data, which may be stored in packet form. Alternatively, the intermediate data may be compressed bit map data so that speed of decompressing the intermediate data can keep up with output speed. Also, when the image forming device 1 has an additional memory that stores image data, such as font data, form data, and logo data, the intermediate data may be packet data indicating character and also indicating address and size of corresponding image data. Further, a form feed code and a font switch code are also stored in packet form. The form feed code may serve as a print command, and the font switch code indicates selected font type.

Next, processes executed by the image forming device 1 will be described. The image forming device 1 executes a message print process, a print command output process, a mode setting process, a sheet-saving print process, a normal print process, an intermediate data generating process, a registration process, and print timing detection process.

Figure 4:
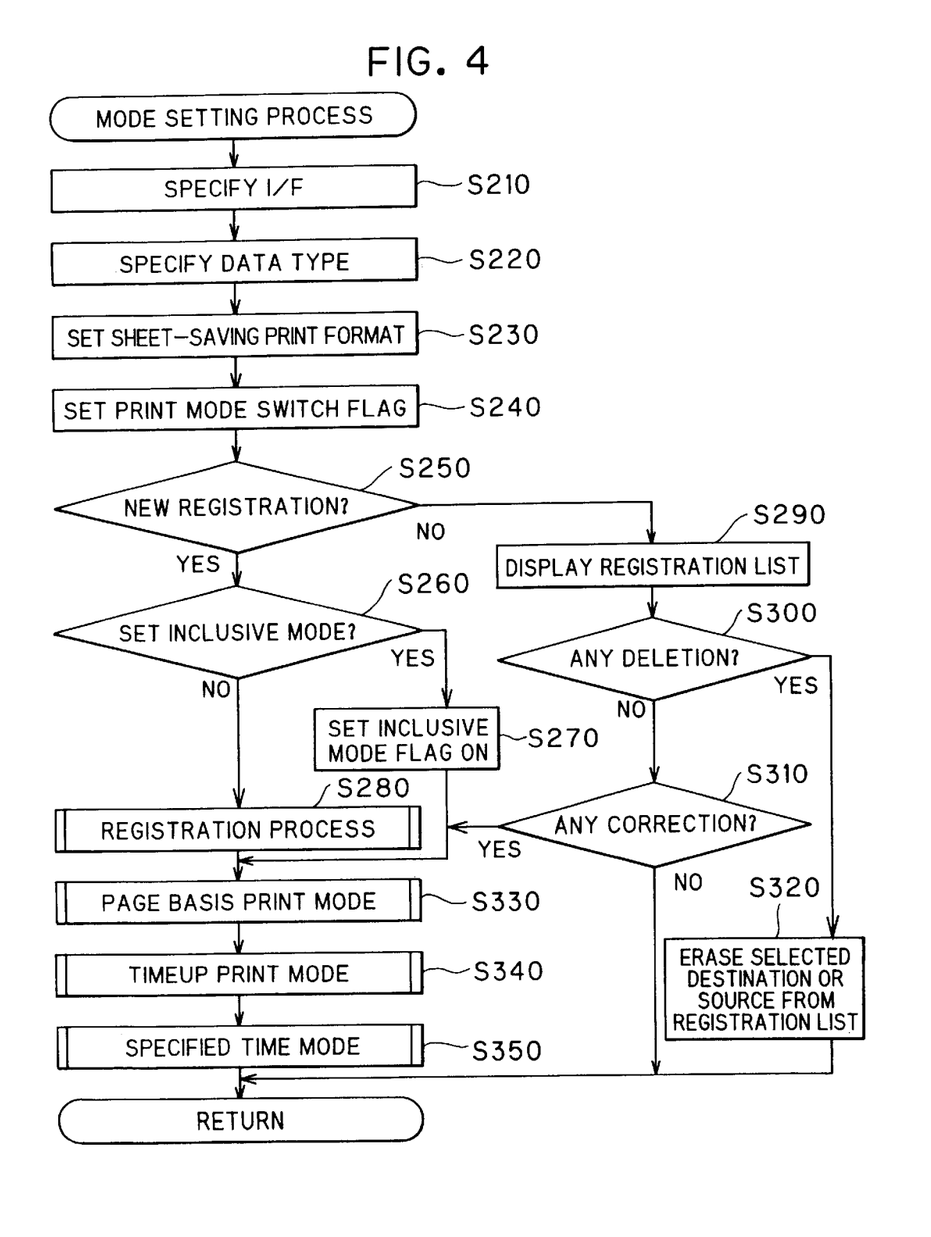
FIG. 4 is a flowchart representing a mode setting routine.

First, the mode setting process will be described while referring to the flowchart shown in FIG. 4. The mode setting process is executed when a user inputs an execution command. The user can input the command by manipulating any one of the operation unit 45, the personal computers 55, 57, 59, and other external devices. However, in this example, it is assumed that the user inputs the command through the operation unit 45. It should be noted that in the following processes, a display, that is, the display unit 47 in this example, displays questions, and that the user inputs responses through the operation unit 45. The responses input by the user are temporarily stored in the work area 215 of the RAM 21.

When the mode setting process is started, first in S210, the user selects a desired one or ones of the FAX interface 11 and the network interface 13. That is, the user can select only the FAX interface 11, only the network interface 13, or both the FAX interface 11 and the network interface 13.

Next in S220, the user selects a type of communication data, that is, facsimile data, e-mail data, or both facsimile data and e-mail data.

Next in S230, the user sets sheet-saving print formats for e-mail and facsimile messages. Specifically, the user specifies, as an e-mail format, the degree that the line pitch and the font size should be reduced, and whether or not the form feed code should be ignored. The e-mail format set by the user is stored as the default e-mail format 211a in the RAM 21. Also, the user specifies, as the facsimile format, the reduction rate of image, for example, whether two pages' worth of data or four pages' worth of data should be printed on a single cut sheet. The facsimile format set by the user is stored as the default facsimile format 211c in the RAM 21. At this time, if the user does not set these formats in S220, an e-mail default format and a facsimile default format are retrieved from the NVRAM 31 or the ROM 25, and stored as the default e-mail format 211a and the default facsimile format 211c in the RAM 21.

Next in S240, the user sets the print mode switch flag ON or OFF.

Next in S250, it is determined whether or not the user wishes to register additional e-mail destinations or facsimile data sources. If the user indicates YES (YES:S250), then in S260, it is determined whether or not an inclusive mode is desired by the user. If so (YES:S260), then in S270, the inclusive mode flag is set to ON, so that the image forming device 1 is set to the inclusive mode. Then, the program proceeds to S330. On the other hand, if not (NO:S260), then the program proceeds to S280 wherein the registration process is performed. Detail of the registration process will be to be described later. Then, the program proceeds to S330.

In S330, it is determined whether or not a page basis print mode is desired by the user. If so, the page basis print flag is set to ON. If not, the page basis print flag is set to OFF. Then, the program proceeds to S340. In S340, it is determined whether or not a timeup print mode is desired by the user. If so, the timeup print flag is set to ON. Also, a waiting time duration is specified by the user. On the other hand, if not, the timeup print flag is set to OFF.

Next in S350, it is determined whether or not the specified time mode is desired by the user. If so, the specified time flag is set to ON. Further, desired time period is specified by the user. On the other hand, if not, the specified time flag is set to OFF. Then, the present program returns.

If S250 results in a negative determination (NO:S250), the program proceeds to S290, wherein the display unit 47 displays the e-mail registration list 212a and the facsimile registration list 212b stored in the RAM 21. Then in S300, it is determined whether or not the user wishes to erase any e-mail destinations or facsimile data sources from the corresponding registration lists 212a, 212b. If the user indicates NO (NO:S300), the program proceeds to S310, wherein it is determined whether or not the user wishes to change any e-mail destinations or facsimile data sources. If the user indicates YES (YES:S310), the program proceeds to S330. On the other hand, if the user indicates NO (NO:S310), the present program returns.

If the user indicates YES in S300 (YES:S300), the program proceeds to S320, wherein any selected e-mail destinations or facsimile data sources are erased from the corresponding registration list 212a, 212b. Then, the present program returns.

Settings made in the mode setting process are stored in a predetermine area of the NVRAM 31, and further in the RAM 21 at starting up of the image forming device 1.

Figure 10:
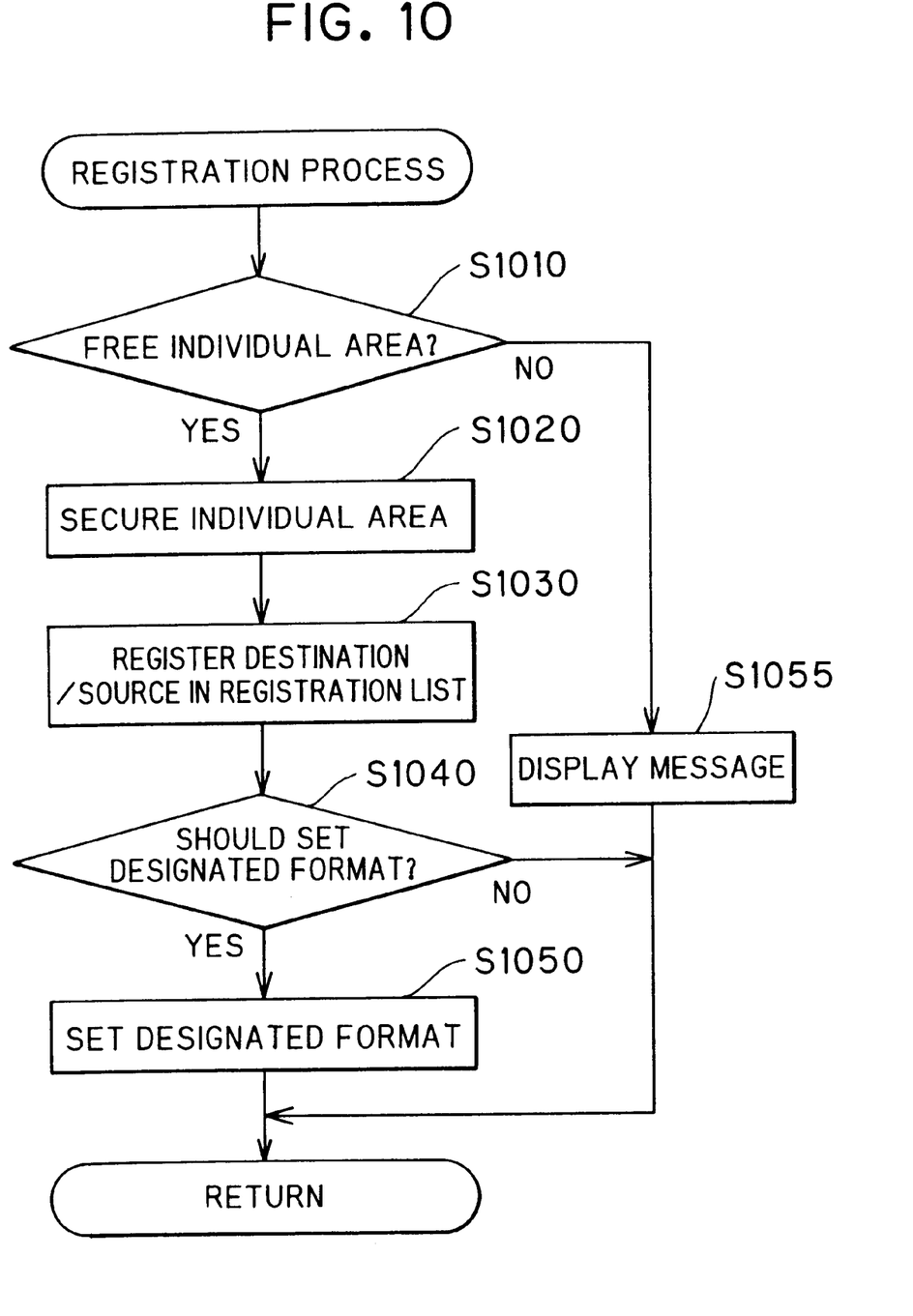
FIG. 10 is a flowchart representing a registration routine.

Next, the registration process executed in S280 of the mode setting process will be described while referring to the flowchart shown in FIG. 10.

It should be noted that if the inclusive mode flag has been set to ON in S270 of the mode setting process, one of the individual areas 213a is secured as a shared area. Because no individual setting is stored in the shared area, the shared area has a relatively large free space.

First, in S1010, it is determined whether or not there is any free individual area 213a. If not (NO:S1010), the program proceeds to S1055 wherein the display unit 47 displays a message indicating that registration cannot be made. Then, the present program returns.

On the other hand, if a free individual area is available (YES:S1010), then in S1020, the free individual area 213a is secured. Then in S1030, the user inputs a new e-mail destination or a new facsimile data source. In this example, it is assumed that a new e-mail destination is inputted. Then, also in S1030, the input e-mail destination is newly listed in the e-mail registration list 212a in association with the individual area 213a which was secured in S1020.

Next in S1040, it is determined whether or not the user wishes to set an e-mail format for the e-mail destination. If no (NO:S1040), then, the present program returns. On the other hand, if so (YES:S1040), then in S1050, the user sets an e-mail format, and the e-mail format is stored as an designated mail format 212b in association with the e-mail destination. More specifically, in S1050, the user specifies the default e-mail format 211a as the designated mail format 211b. Alternatively, the user can set an original individual format. For example, the individual e-mail format 211b can be set to form characters on a cut sheet at printing so that the user can easily recognize e-mail destination. Then, the present program returns.

Although, the above explanation was provided for registering a new e-mail destination, a new facsimile data source can be registered in the same manner. That is, in S1030, an input facsimile data source is newly listed in the facsimile registration list 212b in association with the individual area 213a. Then, in S1050, a designated facsimile format 212b for the facsimile data source is stored in the format area 211 in association with the facsimile data source.

Figure 3:
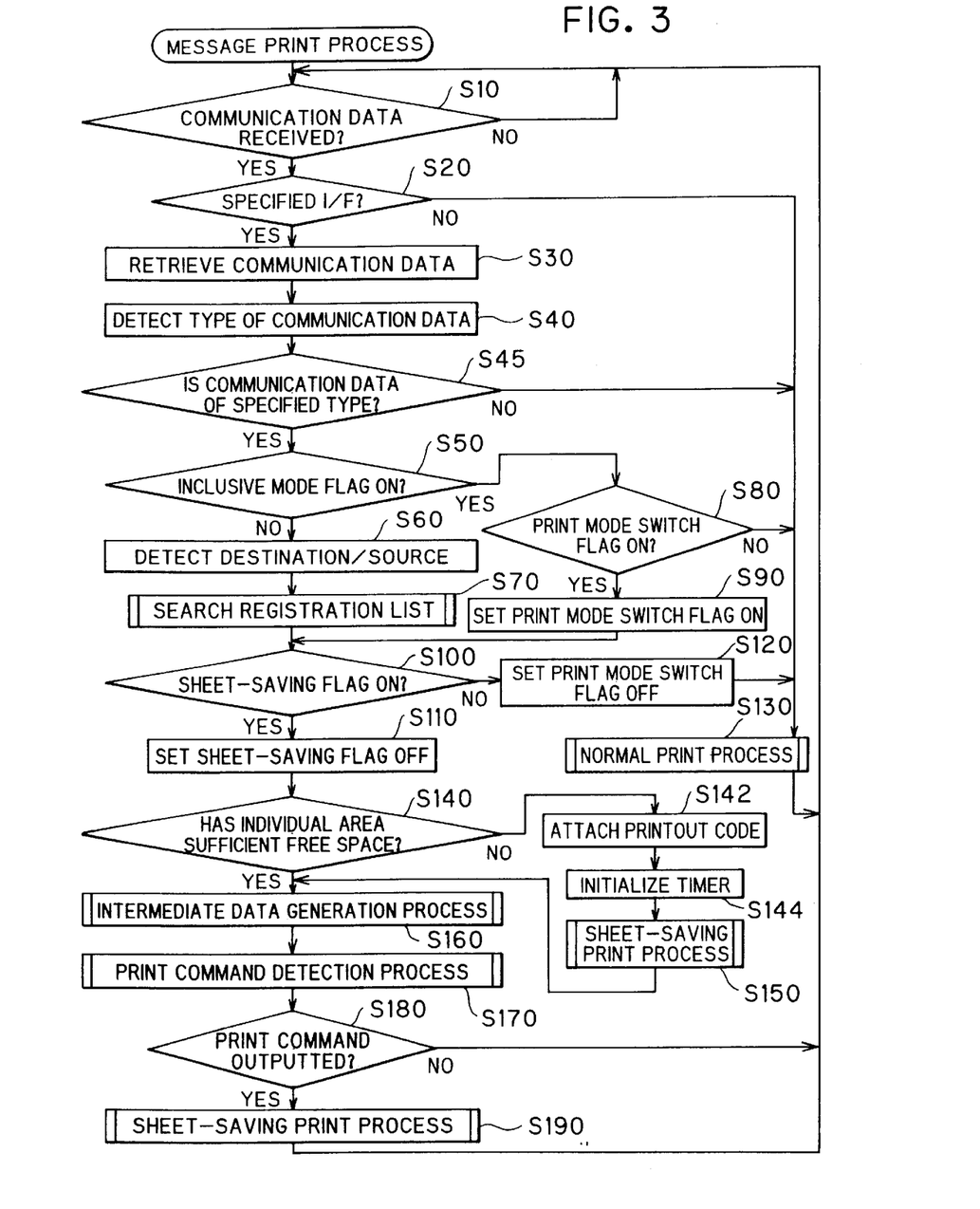
FIG. 3 is a flowchart representing a message print routine according to the embodiment of the present invention.

Next, the message print process will be described while referring to the flowchart shown in FIG. 3.

First, in S10, it is determined whether or not any communication data is received. This determination can be made by detecting whether or not any facsimile data, e-mail data, or print data is received and stored in the reception buffer area 210. If not (NO:S10), then reception of any communication data is awaited. If communication data is received (YES:S10), the program proceeds to S20 wherein it is determined whether or not the communication data is received by the interface specified by the user in the above-described mode setting process. If not (NO:S20), the program proceeds to S130 to perform a normal printing operation. That is, the communication data is processed into intermediate data in a conventional manner, and an image is formed based on the intermediate data. The image formed in this manner has its original size and form without being reduced or changed. Then, the program returns to S10.

On the other hand, if the communication data is received at the specified interface YES:S20), the program proceeds to S30 wherein the communication data is retrieved from the communication buffer area 210, and output to and stored in the work area 215. Then, in S40, it is determined whether the communication data is e-mail data, facsimile data, or some other type of print data. Next in S45, it is determined whether or not the communication data is of the type specified by the user in the mode setting process. If not (NO:S45), the program proceeds to S130 for executing the normal print process. If so (YES:S45), the program proceeds to S50.

In S50, it is determined whether or not the inclusive mode flag is ON. If so (NO:S50), the program proceeds to S60. In S60, if the communication data is e-mail data, an e-mail destination of the e-mail data is detected. If the communication data is facsimile data, a facsimile data source of the facsimile data is detected. Next in S70, the registration list searching process is executed. In this registration list searching process, the sheet-saving flag is set to either ON or OFF. Details of the registration list searching process will be described later.

Next in S100, it is determined whether or not the sheet-saving flag is ON. If not (NO:S100), then the sheet-saving flag is initialized to OFF in S120, and the program proceeds to S130. If so (YES:S100), then in S110, the sheet-saving flag is initialized to OFF, and in S140, it is determined whether or not an individual area 213a in association with the e-mail destination or the facsimile data source has sufficient free space. If so (YES:S140), then in S160, the intermediate data generation process is executed wherein intermediate data is generated and stored in the corresponding individual area 213a. Details of the intermediate data generation process will be described later.

Next, in S170, the print command output process is executed for selectively outputting a print command. The print command output process will be described later in detail. Then, the program proceeds to S180.

In S180, it is determined whether or not the print command has been output in result of the print command output process executed in S170. If not (NO:S180), the program returns to S10. If so (YES:S180), the program proceeds to S190 wherein the sheet-saving print process is executed. Details of the sheet-saving print process will be described later. Then, the program returns to S10.

If S140 results in a negative determination (NO:S140), this means that intermediate data is already stored in the individual area 213a. As a result, in S142, an printout code is attached at the end of the intermediate data, and in S144, a counter value of a corresponding counter is reset. Then, the program proceeds to S150 wherein the sheet-saving print process is executed. As a result, a free space can be secured in the individual area 213a for storing new intermediate data. The sheet-saving print process will be described later. Then, the program proceeds to S160.

If the inclusive mode is indicated (YES:S50), it is determined in S80 whether or not the print mode switch flag is ON. If not (NO:S80), the program proceeds to S130 for executing normal printing. If so (YES:S80), the sheet-saving flag is turned ON in S90, and the program proceeds to S100.

That is, when the inclusive mode flag is ON, if the print mode switch flag is ON, the sheet-saving printing is executed for the communication data. However, if the print mode switch flag is OFF, the normal printing is executed.

Figure 6:
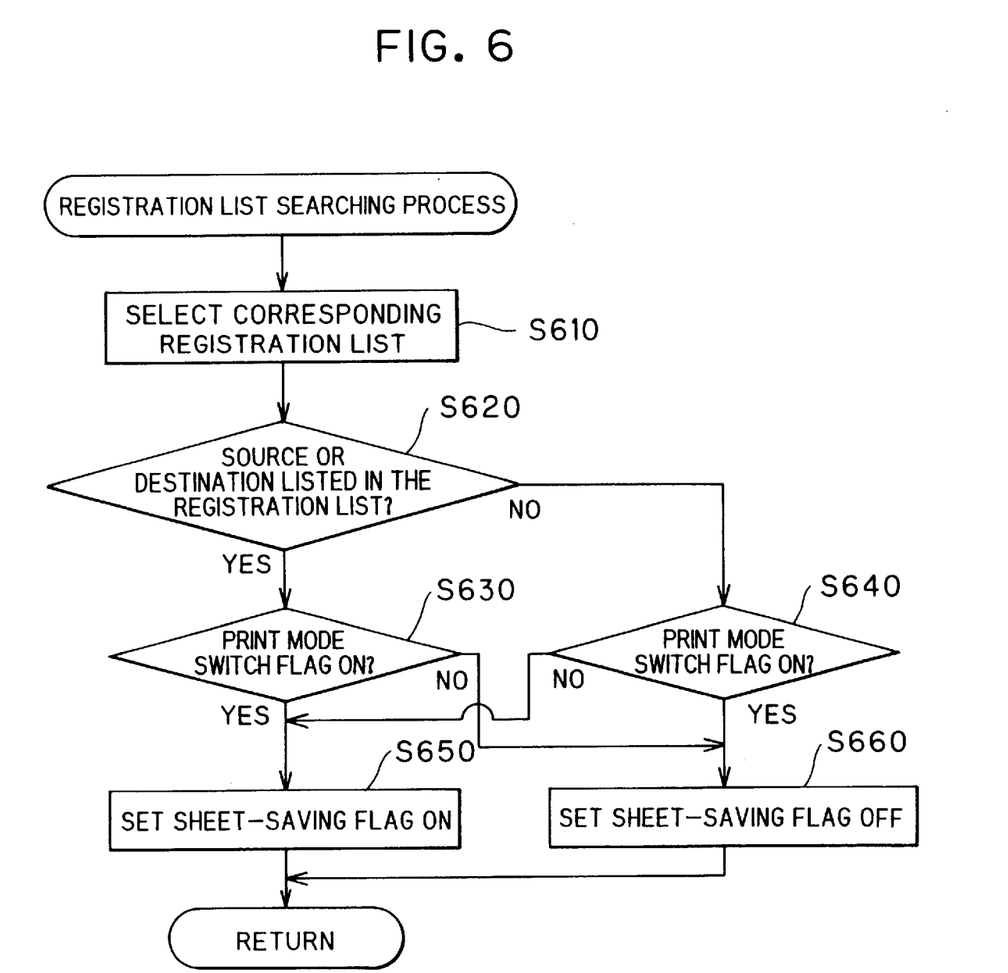
FIG. 6 is a flowchart representing a registration list searching routine.

Next, the registration list searching process which is executed in S70 of the message print process will be described while referring to the flowchart shown in FIG. 6.

First, in S610, one of the e-mail registration list 212a and the facsimile registration list 212b is selected based on the type of the communication data received. Next in S620, it is determined whether or not the e-mail destination or the facsimile data source is listed in the selected registration list 212a, 212b. If so (YES:S620), then in S630, it is determined whether or not the print mode switch flag is ON. If so (YES:S630), then in S650, the sheet-saving flag is set to ON, and the program returns. If not (NO:S630), then in S660, the sheet-saving flag is set to OFF, and the program returns.

If S620 results in a negative determination (NO:S620), then in S640, it is determined whether or not the print mode switch flag is ON. If so (YES:S640), then the program proceeds to S660 for setting the sheet-saving flag OFF. If not (NO:S650), the program proceeds to S650 for setting the sheet-saving flag ON.

That is, when the destination or data source is listed in the corresponding registration list 212a, 212b, if the print mode switch flag is ON, sheet-saving printing is executed for the corresponding communication data. However, if the print mode switch flag is OFF, the normal printing is executed for the communication data. On the other hand, when the destination or data source is not listed in the registration list 212a, 212b, if the print mode switch flag is OFF, the sheet-saving printing is executed for the corresponding communication data. However, if the print mode switch flag is ON, the normal printing is executed for the communication data.

Figure 5:
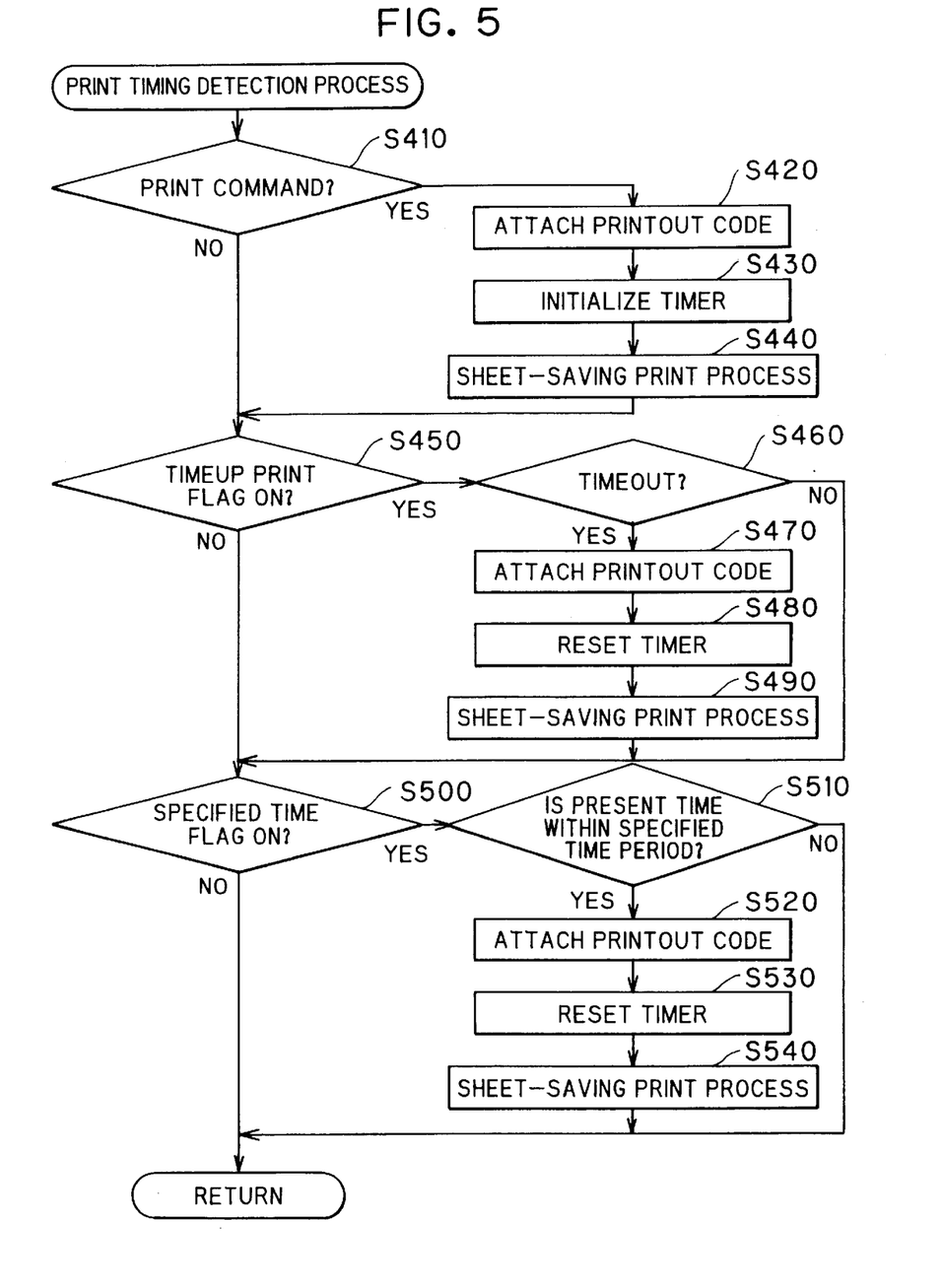
FIG. 5 is a flowchart representing a print timing detection routine.

Next, the print timing detection process will be described while referring to the flowchart shown in FIG. 5. The print timing detection process is executed as an interrupt process for determining whether or not to execute the sheet-saving print process.

First in S410, it is determined whether or not a print command has ben inputted by a user for any desired e-mail destination or facsimile data source. If not (NO:S410), the program proceeds to S450. If so (YES:S410), then in S420, an printout code is attached to the end of intermediate data stored in an individual area 213a in association with the desired e-mail destination or facsimile data source. Then in S430, a counter value of a counter corresponding to the individual area 213a is reset. Next in S440, the sheet-saving print process is executed, and the program proceeds to S450.

In S450, it is determined whether or not the timeup print flag is ON. If not (NO:S450), then the program proceeds to S500. If so (YES:S450), then in S460, it is determined whether or not there is any individual area 213a for which a predetermined waiting time duration has elapsed. If not (NO:S460), then program proceeds to S500. If so (YES:S460), then in S470, an printout code is attached to the end of intermediate data stored in the detected individual area 213a. Next in S480, a counter value of a corresponding counter is reset. Then in S490, the sheet-saving print process is executed, and the program proceeds to S500.

It should be noted that the determination waiting time having elapsed can be determined by comparing a start time of the counter with the present time indicated by the timer 29, and then determining whether or not the predetermined waiting time duration has elapsed since the start time. Alternatively, a predetermined counter value is set when the counter is reset. Then, the counter value is decreased by a regularly executed process. When the counter value reaches zero, it is determined that the waiting time duration has elapsed.

In S500, it is determined whether or not the specified time flag is ON. If not (NO:S500), then the present program returns. If so (YES:S500), then in S510, it is determined whether or not the present time is within a specified time period. If not (NO:S510), the present program returns. If so (YES:S510), then in S520, an printout code is attached to the end of intermediate data stored in any of the individual areas 213a. Further in S530, a corresponding counter is reset. Then, the saving print process is executed in S540, and the program returns.

According to the above-described print timing detection process, printing of intermediate data is executed when a print command is received, when a predetermined waiting time duration has elapsed since communication data was first received, or when communication data is received during a predetermined specified time period.

Figure 7:
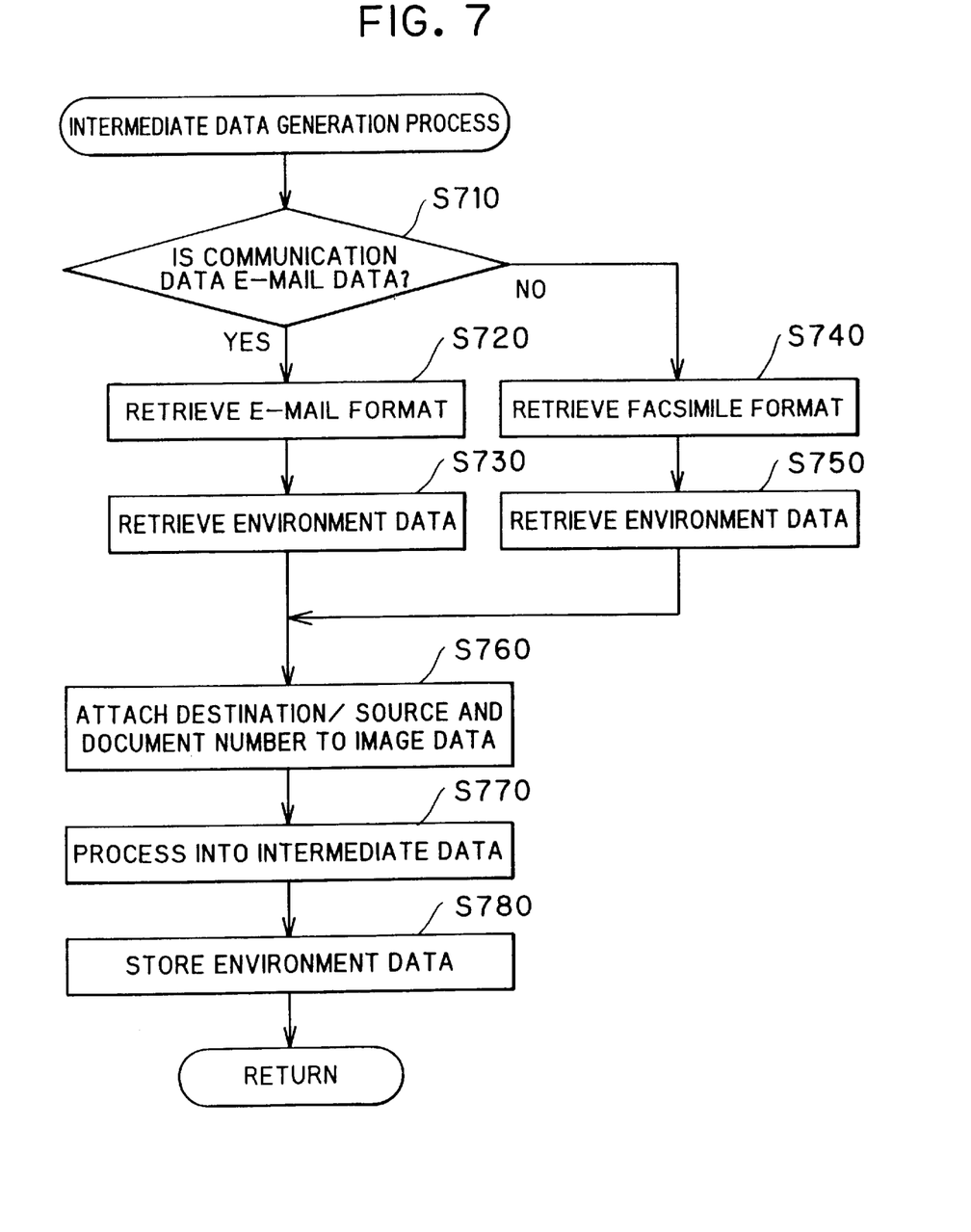
FIG. 7 is a flowchart representing an intermediate data generating routine.

Next, the intermediate data generating process executed in S160 of the message print process will be described while referring to the flowchart shown in FIG. 7. The intermediate data is generated based on any one of the default e-mail format 211a, the designated mail format 211b, the default facsimile format 211c, and the designated facsimile format 211d stored in the RAM 21.

First, in S710, it is determined whether or not the communication data is e-mail data. If so (YES:S710), then the program proceeds to S720. In S720, it is determined whether or not any designated mail format 211b is associated with the e-mail destination of the e-mail data. If so, the designated mail format 211b is retrieved. If not, the default e-mail format 211a is retrieved. Then, in S730, corresponding environment data is retrieved. The environment data indicates, for example, printing position on a cut sheet, and is updated each time new intermediate data is stored in the corresponding individual area 213a. Then, the present program proceeds to S760.

On the other hand, if the communication data is determined not to be e-mail data in S710 (NO:S710), it means that the communication data is facsimile data, and the program proceeds to S740. In S740, it is determined whether or not any designated facsimile format 211d is stored in the RAM 21 in association with the facsimile data source of the facsimile data. If so, the individual facsimile format 211d is retrieved. If not, the default facsimile format 211c is retrieved. Further in S750, corresponding environment data is retrieved. Then, the program proceeds to S760.

In S760, data indicating the e-mail destination or the facsimile data source and data indicating document number of the communication data are attached to message data included in the communication data.

Next in S770, the message data and data attached thereto is processed into intermediate data based on the format retrieved in the previous process. The intermediate data is stored in a corresponding individual area 211a based on a print start position indicated by the retrieved environmental data so as to be stored in sequence with intermediate data which is currently stored in the same individual area 213a. At this time, if the print start position is located outside of a predetermined print region, a form feed code indicating a page end is attached to the end of the currently stored intermediate data. Also, if intermediate data for the fourth page of a four-in-one (i.e., four pages printed on one sheet) image data is currently stored, the form feed code is also attached to the end of the currently stored intermediate data. It should be noted that when the individual area 213a is filled with intermediate data before the currently generating intermediate data is completely generated, the sheet-saving print process is automatically executed.

Next in S780, the environment data is updated for indicating a new print start position. Also, a corresponding counter starts counting to measure time duration. If the counter has been reset, the present time is stored as a start time. It should be noted that at this time, the environment data can be returned to the previous data, that is, of before the saving printing. In this case, the environment data should be stored in the RAM 21 before retrieving the environment data either in S730 or S750. Then, the present routine returns.

Figure 8:
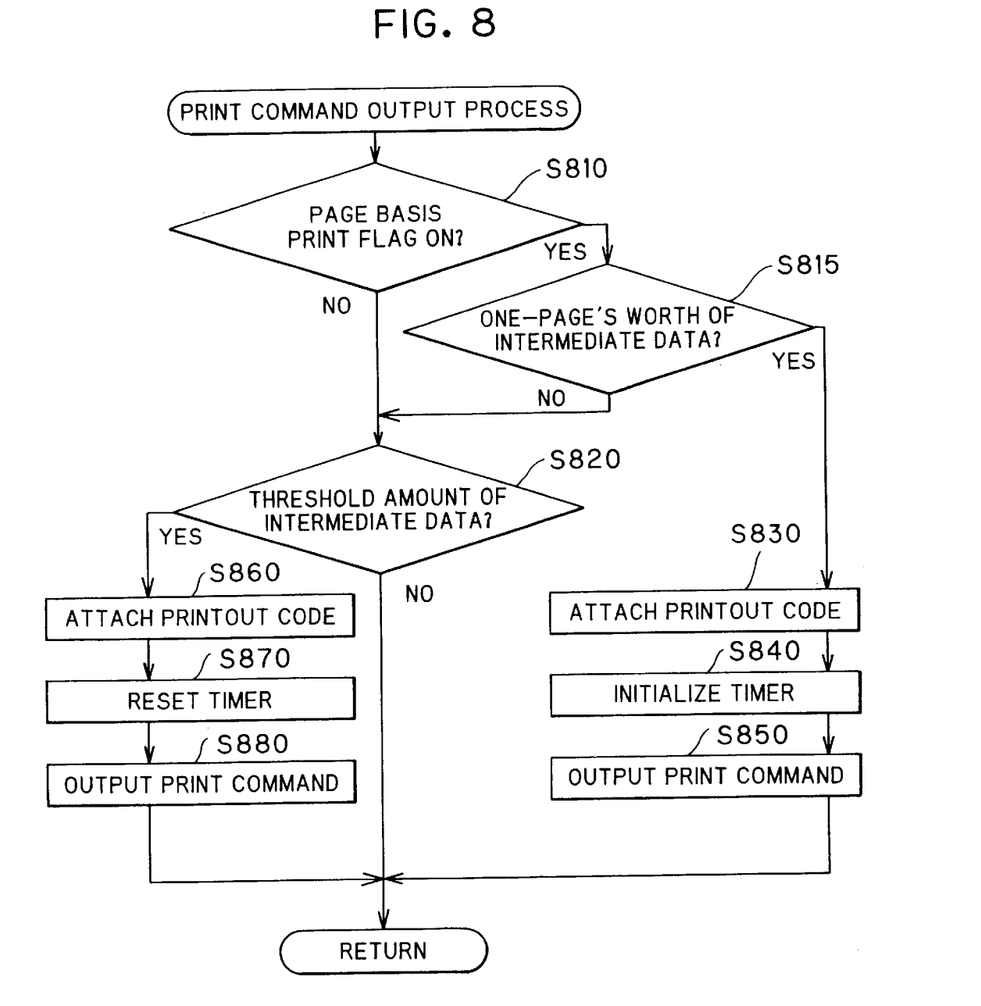
FIG. 8 a flowchart representing a print command output routine.

Next, the print command output process executed in S170 of the message print process will be described while referring to the flowchart shown in FIG. 8.

First in S810, it is determined whether or not the page basis print flag is ON. If not (NO:S810), the program proceeds to S820. If so (YES:S810), then in S815, it is determined whether or not one page's worth of intermediate data is stored in any individual area 213a. This determination can be made by determining whether or not intermediate data stored in each individual area 213a is attached with a form feed code. Also, this determination can be made by detecting intermediate data attached with a form feed code. Alternatively, the RAM 21 can be provided with a managing area in association with each individual area 213a. The managing area stores a counter value indicating a number of form feed code in the corresponding individual area 213a. The counter value is increased at generation of the intermediate data and decreased at printing.

If S815 results in an affirmative determination (YES:S815), then in S830, an printout code is attached to the end of a first page of the intermediate data. Then, in S840, a corresponding counter a reset. Next in S850, a print command is outputted, and the present routine returns.

On the other hand, if S815 results in a negative determination (NO:S815), then in S820, it is determined whether or not each individual area 213a stores almost a maximum amount of intermediate data. This determination can be made by determining whether or not the amount of stored intermediate data has reached a predetermined threshold amount. If not (NO:S820), the present program returns. On the other hand, if so (YES:S820), then in S860, an printout code is attached to the end of the intermediate data stored in the individual area 213a. A corresponding counter is reset in S870. The print command is output in S880, and the present routine returns.

As described above, when the page basis print flag is ON, printing is executed when one page's worth of intermediate data for one individual area 213a is generated, and also when the amount of the intermediate data stored in one individual area 213a nears the maximum amount.

Figure 9:
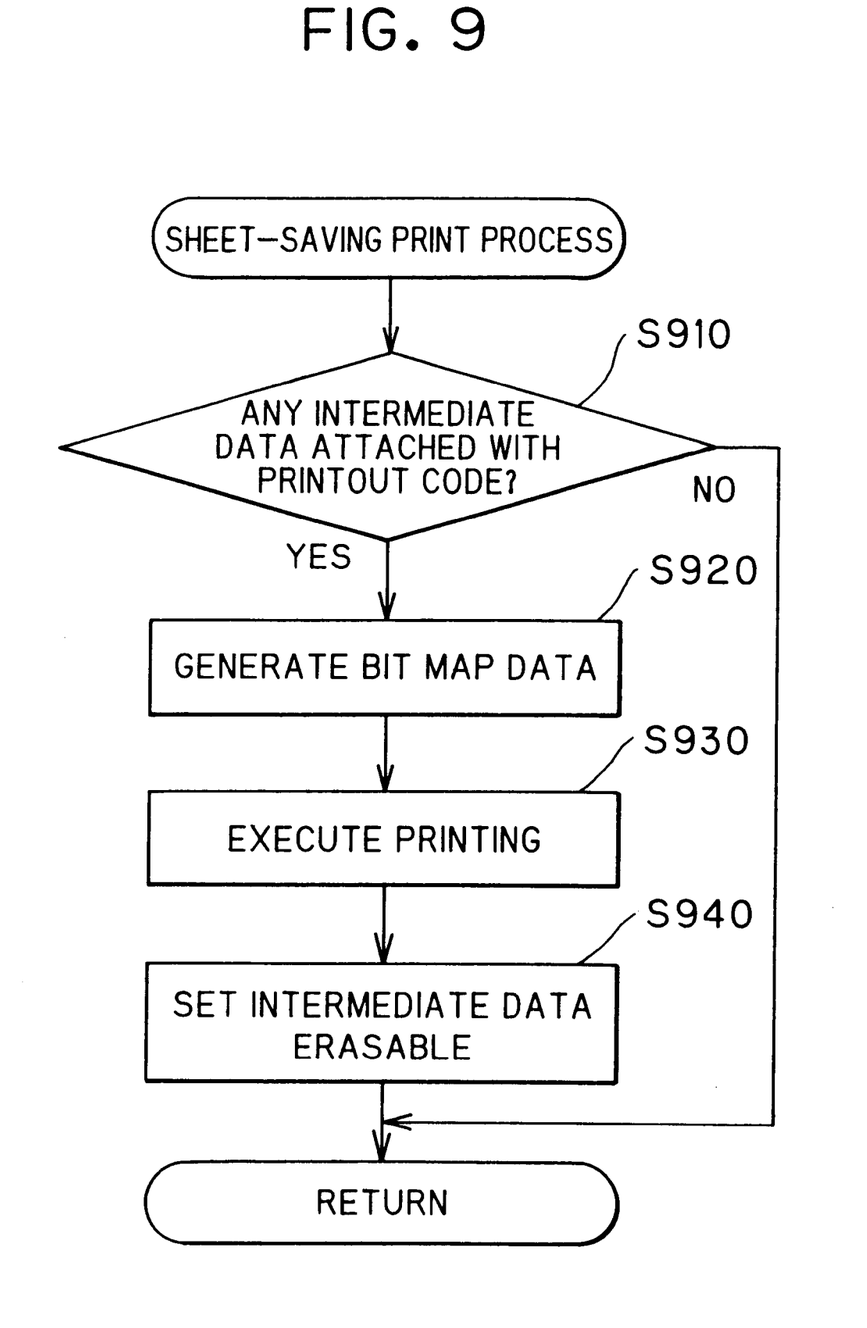
FIG. 9 is a flowchart representing a sheet-saving print routine.

Next, the sheet-saving print process will be described while referring to the flowchart shown in FIG. 9. The sheet-saving print process is executed in S190 of the message print routine, and in S440, S490, and S540 of the print timing detection process.

First in S910, it is determined whether or not any individual area 213a is storing intermediate data attached with an printout code. If not (NO:S910), the present program returns. On the other hand, if so (YES:S910), then in S920, bit map data is generated from the intermediate data which is attached with the printout code, and stored in the output buffer 214. Then, in S930, one page's worth of the bit map data is outputted to the printer engine 41. The printing is executed based on the bit map data, thereby forming a compressed image on a cut sheet. This process is repeated until all of the bit map data is outputted. Then, in S940, the intermediate data is set erasable so that new intermediate data can be stored in the individual area 213a. Then, the present routine returns.

Accordingly to the above-described embodiment, sheet-saving printing can be executed only for specified communication data. Therefore, the sheet-saving printing can be selectively executed only when needed.

Also, according to the above-described embodiment, when less than one-page's worth of communication data is received, a plurality of sets of communication data can be formed on a single cut sheet. Therefore, waste of recording medium can be prevented. Also, a compressed image corresponding to communication data can be formed. The compressed image has a higher character density per unit area than a normal image. This further reliably prevents wasting of recording medium.

Also, communication data is processed into intermediate data based on a sheet-saving print format, wherein a line pitch and/or a font size is reduced. Therefore, the compressed image based on the intermediate data is formed with high quality, without being blurred as in the case when an image is first formed based on the e-mail data, and then, the size of the image is reduced by cutting out lines in the image.

Because intermediate data processed from communication data is stored in a corresponding individual area 213a, communication data received from the same data source or addressed to the same destination can be printed out on the same cut sheet.

When the page basis print mode is set, sheet-saving printing is automatically executed when one page's worth of intermediate data is generated for a single individual area 213a. Therefore, operation on the image forming device 1 can be simplified.

When the specified time mode is set, sheet-saving printing is automatically executed for intermediate data generated from communication data which is received during a specified time period. This function is preferably used to print communication data that is needed to be printed immediately when received.

Also, when the timeup print mode is set, sheet-saving printing is automatically executed when a predetermined waiting time duration is elapsed regardless of the amount of intermediate data. Usually, unpredictable amount of communication data is received at unpredictable time. However, received communication data needs to be printed out sometime. Therefore, it is convenient to execute printing at regular interval.

While the invention has been described in detail with reference to specific embodiments thereof, it would be apparent to those skilled in the art that various changes and modifications may be made therein without departing from the spirit of the invention, the scope of which is defined by the attached claims.

What is claimed is:

1. An image forming device, comprising:
    an interface that receives communication data from remote devices;
    a first memory that stores the communication data;
    a second memory that stores a format;
    a process unit that processes specified type of communication data into compressed intermediate data based on the format;
    a printer that executes printing for forming a compressed image on a recording medium based on the compressed intermediate data; and
    a control unit that controls the printer to execute printing, wherein when the communication data is received during a predetermined time period, the control unit controls the printer to immediately execute printing based on the compressed intermediate data processed from the communication data.

2. The image forming device according to claim 1, wherein the format indicates at least one of a font size reduction rate, a line pitch reduction rate, and whether or not to ignore a form feed code.

3. The image forming device according to claim 1, wherein the printer executes printing for forming an image corresponding to a plurality of page's worth of communication data on a single page of the recording medium based on the compressed intermediate data.

4. The image forming device according to claim 1, further comprising a third memory that stores the compressed intermediate data, wherein when one page's worth of compressed intermediate data is stored in the third memory, the control unit controls the printer to execute printing based on the one page's worth of the compressed intermediate data.

5. The image forming device according to claim 1, wherein the communication data is e-mail data, and the printer executes printing for forming an image including an increased number of characters per unit area of the recording medium.

6. The image forming device according to claim 1, further comprising an input unit that inputs a destination, wherein the second memory further stores a list, and the destination inputted by the input unit is listed in the list, and wherein the process unit processes the communication data addressed to the destination into the compressed intermediate data.

7. The image forming device according to claim 6, further comprising a fourth memory including a plurality of individual areas, wherein the list lists a plurality of destinations in association with corresponding one of the plurality of individual areas, and the compressed intermediate data processed from the communication data which is addressed to one of the plurality of destinations is stored in a corresponding one of the individual area, and wherein the control unit controls the printer to execute printing on a destination basis when requested by a user.

8. The image forming device according to claim 1, further comprising an input unit that inputs data identifying a transmission site, wherein the second memory further stores a list, and the data inputted by the input unit is listed in the list, and wherein the process unit processes the communication data received from the transmission site into the compressed intermediate data.

9. The image forming device according to claim 8, further comprising a fifth memory including a plurality of the individual areas, wherein the list lists a plurality of sets of data each identifying a transmission site in association with corresponding one of the plurality of individual areas, the compressed intermediate data processed from the communication data which is addressed to one of the transmission sites is stored in a corresponding one of the individual areas, and wherein the control unit controls the printer to execute printing on a transmission-site basis when requested by a user.

10. The image forming device according to claim 1, wherein the second memory further stores an another format, and wherein the process unit processes unspecified type of communication data into normal intermediate data based on the another format, and the printer executes printing for forming an original sized image on a recording medium based on the normal intermediate data.

11. A method of controlling an image forming device for forming an image based on e-mail data received by an interface, the method comprising the steps of:
  a) receiving e-mail data;
  b) processing the e-mail data into compressed intermediate data based on a format, the format including at least one of a font size reduction rate, a line pitch reduction rate, and a form feed ignoring command;
  c) storing the compressed intermediate data into a memory in sequence with any compressed intermediate data currently stored in the memory, wherein the any compressed intermediate data currently stored in the memory has been processed from different e-mail data; and
  d) forming a compressed image based on the compressed intermediate data if the compressed intermediate data stored in the memory reaches a predetermined data amount;
  wherein the predetermined data amount is one-page worth of compressed intermediate data.

12. The method according to claim 11, further comprising:
  forming a compressed image based on the compressed intermediate data if a predetermined waiting time duration has elapsed before the compressed intermediate data stored in the memory reaches one-page worth after the e-mail data has been received.

13. The method according to claim 11, further comprising:
  receiving a selection of one of a normal print mode and a sheet-saving print mode; and performing a normal print process if the normal print made is selected, and performing a sheet-saving process if the sheet-saving print mode is selected.

14. A recording medium storing a program controlling an image forming device, the program comprising the programs of:
  a) receiving e-mail data;
  b) processing the e-mail data into compressed intermediate data based on a format, the format including at least one of a font size reduction rate, a line pitch reduction rate, and a form feed ignoring command;
  c) storing the compressed intermediate data into a memory in sequence with any compressed intermediate data currently stored in the memory, wherein the any compressed intermediate data currently stored in the memory has been processed from different e-mail data; and
  d) forming a compressed image based on the compressed intermediate data if the compressed intermediate data stored in the memory reaches a predetermined data amount;
  wherein the predetermined data amount is one-page worth of compressed intermediate data.

15. The recording medium storing a program controlling an image forming device according to claim 14, the program further comprising the program of:
  forming a compressed image based on the compressed intermediate data if a predetermined waiting time duration has elapsed before the compressed intermediate data stored in the memory reaches one-page worth after the e-mail data has been received.

16. The recording medium storing a program controlling an image forming device according to claim 14, the program further comprising the program of:
  receiving a selection of one of a normal print mode and a sheet-saving print mode; and performing a normal print process if the normal print made is selected, and performing a sheet-saving process if the sheet-saving print mode is selected.

17. An image forming device, comprising:
  an interface that receives e-mail data from remote devices;
  a first memory that stores a format, the format including at least one of a font size reduction rate, a line pitch reduction rate, and a form feed ignoring command;
  a process unit that processes the e-mail data into compressed intermediate data based on the format;
  a second memory that stores the compressed intermediate data in sequence with compressed intermediate data currently stored in the second memory, wherein the compressed intermediate data currently stored in the second memory has been processed from different e-mail data;
  a determining unit that determines whether or not a data amount of compressed intermediate data stored in the second memory reaches a predetermined data amount;
  a printer that executes printing for forming a compressed image on a recording medium based on the compressed intermediate data stored in the second memory; and
  a control unit that controls the printer to execute printing when the data amount of compressed intermediate data in the second memory is determined reaching the predetermined data amount;
  wherein the predetermined data amount is one-page worth of compressed intermediate data.

18. The image forming device according to claim 17, wherein the e-mail data is received during a predetermined time period, the control unit controls the printer to immediately execute printing based on the compressed intermediate data processed from the e-mail.

19. The image forming device according to claim 17, further comprising an input unit that inputs a destination, wherein the first memory further stores a list, and the destination inputted by the input unit is listed in the list, and wherein the process unit processes the e-mail data addressed to the destination into the compressed intermediate data.

20. The image forming device according to claim 19, further comprising a third memory including a plurality of individual areas, wherein the list lists a plurality of destinations in association with a corresponding one of the plurality of individual areas, and the compressed intermediate data processed from the e-mail data which is addressed to one of the plurality of destinations is stored in a corresponding one of the individual area, and wherein the control unit controls the printer to execute printing on a destination basis when requested by a user.

21. The image forming device according to claim 17, further comprising an input unit that inputs data identifying a transmission site, wherein the first memory further stores a list, and the data inputted by the input unit is listed in the list, and wherein the process unit processes the e-mail data received from the transmission site into the compressed intermediate data.

22. The image forming device according to claim 21, further comprising a fourth memory including a plurality of individual areas, wherein the list lists a plurality of sets of data each identifying a transmission site in association with a corresponding one of the plurality of individual areas, the compressed intermediate data processed from the e-mail data which is addressed to the transmission site is stored in the corresponding one of the plurality of individual areas, and wherein the control unit controls the printer to execute printing on a transmission-site basis when requested by a user.

23. The image forming device according to claim 17, wherein the first memory further stores an another format, and wherein the process unit processes an unspecified type of e-mail data into normal intermediate data based on the another format, and the printer executes printing for forming an original sized image on a recording medium based on the normal intermediate data.

24. The image forming device according to claim 17, wherein
   the determining unit determines whether or not a predetermined waiting time duration has elapsed; and
   the control unit controls the printer to execute printing when the predetermined waiting time duration has elapsed before the compressed intermediate data stored in the memory reaches one-page worth after the e-mail data has been received.

25. The image forming device according to claim 24, wherein the e-mail data is received during a predetermined time period, the control unit controls the printer to immediately execute printing based on the compressed intermediate data processed from the e-mail.

26. The image forming device according to claim 24, further comprising an input unit that inputs a destination, wherein the first memory further stores a list, and the destination inputted by the input unit is listed in the list, and wherein the process unit processes the e-mail data addressed to the destination into the compressed intermediate data.

27. The image forming device according to claim 26 further comprising a third memory including a plurality of individual areas, wherein the list lists a plurality of destinations in association with a corresponding one of the plurality of individual areas, and the compressed intermediate data processed from the e-mail data which is addressed to one of the plurality of destinations is stored in a corresponding one of the individual area, and wherein the control unit controls the printer to execute printing on a destination basis when requested by a user.

28. The image forming device according to claim 24, further comprising an input unit that inputs data identifying a transmission site, wherein the first memory further stores a list, and the data inputted by the input unit is listed in the list, and wherein the process unit process the e-mail data received from the transmission site into the compressed intermediate data.

29. The image forming device according to claim 28, further comprising a fourth memory including a plurality of individual areas, wherein the list lists a plurality of sets of data each identifying a transmission site in association with a corresponding one of the plurality of individual areas, the compressed intermediate data processed from the e-mail data which is addressed to the transmission site is stored in the corresponding one of the plurality of individual areas, and wherein the control unit controls the printer to execute printing on a transmission-site basis when requested by a user.

30. The image forming device according to claim 24, wherein the first memory further stores an another format, and wherein the process unit processes an unspecified type of e-mail data into normal intermediate data based on the another format, and the printer executes printing for forming an original sized image on a recording medium based on the normal intermediate data.

31. The image forming device according to claim 17, further comprising:
   a selection unit that receives a selection of one of a normal print mode and a sheet-saving print mode, wherein the control unit controls the printer to execute a normal print process if the normal print mode is selected, and to execute a sheet-saving print process if the sheet-saving print mode is selected.

* * * * *